United States Patent
Murata et al.

(10) Patent No.: US 9,039,955 B2
(45) Date of Patent: May 26, 2015

(54) POWDER MATERIAL IMPREGNATION METHOD AND METHOD FOR PRODUCING FIBER-REINFORCED COMPOSITE MATERIAL

(75) Inventors: Hiroshige Murata, Tokyo (JP);
Yasutomo Tanaka, Yokohama (JP);
Yuuki Nonaka, Tokorozawa (JP);
Takeshi Nakamura, Tokyo (JP)

(73) Assignee: IHI CORPORATION (JP)

( * ) Notice: Subject to any disclaimer, the term of this patent is extended or adjusted under 35 U.S.C. 154(b) by 319 days.

(21) Appl. No.: 13/636,735

(22) PCT Filed: Mar. 29, 2011

(86) PCT No.: PCT/JP2011/057735
§ 371 (c)(1),
(2), (4) Date: Sep. 24, 2012

(87) PCT Pub. No.: WO2011/122593
PCT Pub. Date: Oct. 6, 2011

(65) Prior Publication Data
US 2013/0009348 A1    Jan. 10, 2013

(30) Foreign Application Priority Data
Mar. 29, 2010  (JP) .............................. P2010-074283

(51) Int. Cl.
*B28B 19/00* (2006.01)
*C04B 35/571* (2006.01)
(Continued)

(52) U.S. Cl.
CPC ............... *B28B 19/00* (2013.01); *C04B 35/571* (2013.01); *C04B 35/573* (2013.01);
(Continued)

(58) Field of Classification Search
CPC ............ C04B 35/565; C04B 35/62281; B28B 1/04–1/105
USPC ................................................... 264/640, 682
See application file for complete search history.

(56) References Cited

U.S. PATENT DOCUMENTS 4,877,643 A * 10/1989 Ishikawa et al. ............... 427/601
6,180,232 B1 * 1/2001 McCullough et al. ........ 428/379
(Continued)

FOREIGN PATENT DOCUMENTS

| JP | 4-026564 | 1/1992 |
| JP | 9-143767 | 6/1997 |

(Continued)

OTHER PUBLICATIONS

International Search Report and Written Opinion mailed Jun. 7, 2011 in corresponding PCT International Application No. PCT/JP2011/057735.
(Continued)

*Primary Examiner* — Joseph S Del Sole
*Assistant Examiner* — Russell Kemmerle, III
(74) *Attorney, Agent, or Firm* — Ostrolenk Faber LLP

(57) ABSTRACT

When a molded fabric body (X) is impregnated with a powder (K) of a predetermined material, there are performed a first step of dispersing the powder (K) in a liquid to prepare a slurry, and a second step of burying the molded fabric body (X) made of fiber bundles in the slurry and vibrating the slurry by use of a predetermined vibrator (M). Furthermore, in the second step, the vibrator (M) is moved along a surface of the molded fabric body (X). As a result, it is possible to improve the rate of impregnation of the powder (K) more than that in the conventional cases, irrespective of the shape of the molded fabric body (X).

14 Claims, 6 Drawing Sheets

(51) Int. Cl.
*C04B 35/573* (2006.01)
*C04B 35/628* (2006.01)
*C04B 35/80* (2006.01)
*D06M 23/08* (2006.01)

(52) U.S. Cl.
CPC .... *C04B 35/62868* (2013.01); *C04B 35/62873* (2013.01); *C04B 35/62884* (2013.01); *C04B 35/806* (2013.01); *C04B 2235/422* (2013.01); *C04B 2235/428* (2013.01); *C04B 2235/5244* (2013.01); *C04B 2235/5252* (2013.01); *C04B 2235/5256* (2013.01); *C04B 2235/614* (2013.01); *C04B 2235/616* (2013.01); *D06M 23/08* (2013.01)

(56) References Cited

U.S. PATENT DOCUMENTS

| | | | |
|---|---|---|---|
| 6,245,425 B1 * | 6/2001 | McCullough et al. | 428/379 |
| 6,336,495 B1 * | 1/2002 | McCullough et al. | 164/461 |
| 6,344,270 B1 * | 2/2002 | McCullough et al. | 428/389 |
| 6,368,663 B1 * | 4/2002 | Nakamura et al. | 427/248.1 |
| 6,447,927 B1 * | 9/2002 | McCullough et al. | 428/558 |
| 6,460,597 B1 * | 10/2002 | McCullough et al. | 164/91 |
| 6,537,617 B2 * | 3/2003 | Nakamura et al. | 427/376.2 |
| 6,544,645 B1 * | 4/2003 | McCullough et al. | 428/379 |
| 6,723,381 B1 * | 4/2004 | Murata et al. | 427/249.15 |
| 6,723,382 B2 * | 4/2004 | Yamaguchi et al. | 427/249.2 |
| 8,728,383 B2 * | 5/2014 | Murata et al. | 264/640 |
| 2003/0008067 A1 * | 1/2003 | Yamaguchi et al. | 427/249.15 |
| 2008/0081757 A1 * | 4/2008 | Murata et al. | 501/88 |
| 2010/0209659 A1 * | 8/2010 | Boskovic | 428/113 |
| 2012/0040106 A1 * | 2/2012 | Simmerer et al. | 427/560 |
| 2014/0179188 A1 * | 6/2014 | Murata et al. | 442/178 |

FOREIGN PATENT DOCUMENTS

| | | |
|---|---|---|
| JP | 2000-114217 | 4/2000 |
| JP | 2001-335378 | 12/2001 |
| JP | 2003-020287 | 1/2003 |
| JP | 2003-148105 | 5/2003 |
| JP | 2003-261381 | 9/2003 |
| JP | 2006-347837 | 12/2006 |
| JP | 2007-289807 | 11/2007 |
| JP | 2008-081379 | 4/2008 |
| JP | 2008-238152 | 10/2008 |
| JP | 2008-247722 | 10/2008 |

OTHER PUBLICATIONS

Japanese Decision of Rejection, dated Aug. 5, 2014, issued in corresponding Japanese Patent Application No. 2012-508330. English Translation. Total 2 pages.

* cited by examiner

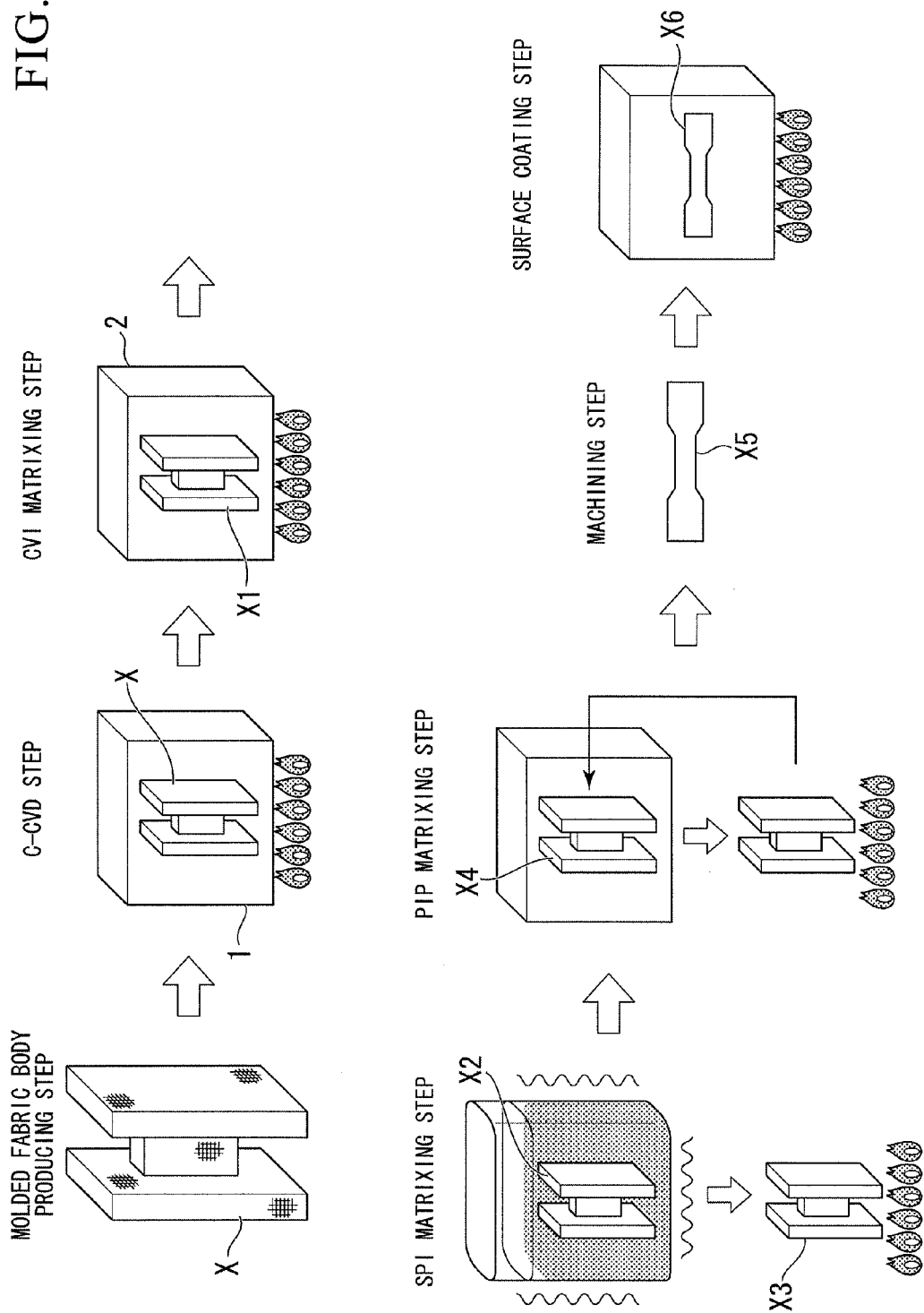

POWDER MATERIAL IMPREGNATION METHOD AND METHOD FOR PRODUCING FIBER-REINFORCED COMPOSITE MATERIAL

CROSS-REFERENCE TO RELATED APPLICATIONS

The present application is a 35 U.S.C. §§371 national phase conversion of PCT/JP2011/057735, filed Mar. 29, 2011, which claims priority of Japanese Patent Application No. 2010-74283, filed Mar. 29, 2010, the contents of which are incorporated herein by reference. The PCT International Application was published in the Japanese language.

TECHNICAL FIELD

The present invention relates to a powder material impregnation method and a method for producing a fiber-reinforced composite material.

BACKGROUND ART

Patent Document 1 listed below describes the following procedure as one step in the method for producing a ceramic matrix composite. A fabric is buried in a mixture made of a carbon powder, a silicon powder, and medium, and the fabric buried in the mixture is contained in a container. Then, the mixture is vibrated from outside by an ultrasonic vibration exciter, to thereby impregnate the spaces of the fabric with the carbon powder and the silicon powder.

Patent Document 2 listed below discloses a method for producing a ceramic matrix composite member. In the method, a carbon powder and a silicon powder both in a solid phase are mixed and dispersed. A solvent and a dispersant are added thereto into slurry. A fiber fabric made of SiC fibers is immersed in the slurry to impregnate the internal portion of the fiber fabric with the carbon powder and the silicon powder. The fiber fabric is then burnt, to thereby produce a ceramic matrix composite member.

CITATION LIST

Patent Document

Patent Document 1: Japanese Unexamined Patent Application, First Publication No. 2008-081379
Patent Document 2: Japanese Unexamined Patent Application, First Publication No. 2001-335378

SUMMARY OF INVENTION

Technical Problem

However, the aforementioned conventional techniques are not sufficient in the rate of impregnation of the powders between the fibers of the fabric. In addition, Patent Document 1 addresses the low rate of impregnation of Patent Document 2, and adopts a means of vibrating the mixture, in which the fabric is immersed, by use of the ultrasonic vibration exciter to further improve the rate of impregnation. However, while a sufficient rate of impregnation is obtained in the case of a fabric formed in a flat plate, a sufficient rate of impregnation is not obtained in the case of a fabric with a comparatively large shape and a fabric formed in a cubic, complicated shape. The present invention has been achieved in view of the aforementioned circumstances, and has an object to improve the rate of impregnation irrespective of the shape of the fabric more than that in the conventional cases.

Solution to Problem

To achieve the above object, as a first solution according to a powder material impregnation method, the present invention includes: a first step of dispersing a powder of a predetermined material in a liquid to prepare a slurry; and a second step of burying a molded fabric body made of fiber bundles in the slurry and vibrating the slurry by use of a predetermined vibrator, in which, in the second step, the vibrator is moved along a surface of the molded fabric body.

As a second solution according to the powder material impregnation method, the present invention includes: a first step of dispersing a powder of a predetermined material in a liquid to prepare a slurry; and a second step of burying a molded fabric body made of fiber bundles in the slurry and vibrating the slurry by use of a predetermined vibrator, in which, in the second step, the slurry and the molded fabric body are contained in a container fitted to an outer shape of the molded fabric body, and the vibrator is arranged on a surface of the container to vibrate the slurry.

As a third solution according to the powder material impregnation method, the present invention includes: a first step of dispersing a powder of a predetermined material in a liquid to prepare a slurry; and a second step of burying a molded fabric body made of fiber bundles in the slurry and vibrating the slurry by use of a predetermined vibrator, in which, in the second step, a vibration transmission member for transmitting a vibration generated by the vibrator is arranged around the molded fabric body.

As a fourth solution according to the powder material impregnation method, in the aforementioned third solution, the vibration transmission member includes a plurality of solid or hollow metal materials that stand around the molded fabric body.

As a fifth solution according to the powder material impregnation method, in any one of the aforementioned first to third solutions, the predetermined material includes carbon (C) and silicon (Si), and the fiber bundle is made of a silicon carbide (SiC).

As a first solution according to a method for producing a fiber-reinforced composite material, the present invention includes: a molded body producing step of producing a predetermined-shaped molded fabric body from a fabric fragment that is woven from fiber bundles; a first impregnation step of impregnating the molded fabric body with a predetermined material by subjecting the molded fabric body to a vapor phase treatment; a second impregnation step of impregnating the molded fabric body with a predetermined material by the powder material impregnation method according to any one of the first to fourth solutions; and a reaction burning step of subjecting the molded fabric body obtained through the second impregnation step to a reaction burning treatment.

As a second solution according to the method for producing a fiber-reinforced composite material, the first solution further includes: a closely-packing step of impregnating the burned body with a material of a same type as the powder by a PIP (Polymer Impregnation and Pyrolysis) method, to thereby make the burned body more closely-packed.

Advantageous Effects of Invention

The powder material impregnation method according to the present invention includes: a first step of dispersing the powder in a liquid to prepare a slurry; and a second step of burying a molded fabric body made of fiber bundles in the slurry and vibrating the slurry by use of a predetermined vibrator. In the second step, the vibrator is moved along a surface of the molded fabric body. Therefore, it is possible to improve the rate of impregnation of the powder into the molded fabric body more than that in the conventional cases, irrespective of the shape of the molded fabric body, namely, even if the molded fabric body does not have a planar shape but has a cubic shape.

Furthermore, according to the method for producing a fiber-reinforced composite material based on this powder material impregnation method, it is possible to produce a high-performance fiber-reinforced composite material in which a component derived from the powder is highly closely attached to the spaces in the molded fabric body.

BRIEF DESCRIPTION OF DRAWINGS

FIG. 1 is a step diagram showing a method for producing a ceramic matrix composite (fiber-reinforced composite material) according to an embodiment of the present invention.

DESCRIPTION OF EMBODIMENTS

Figure 2A:
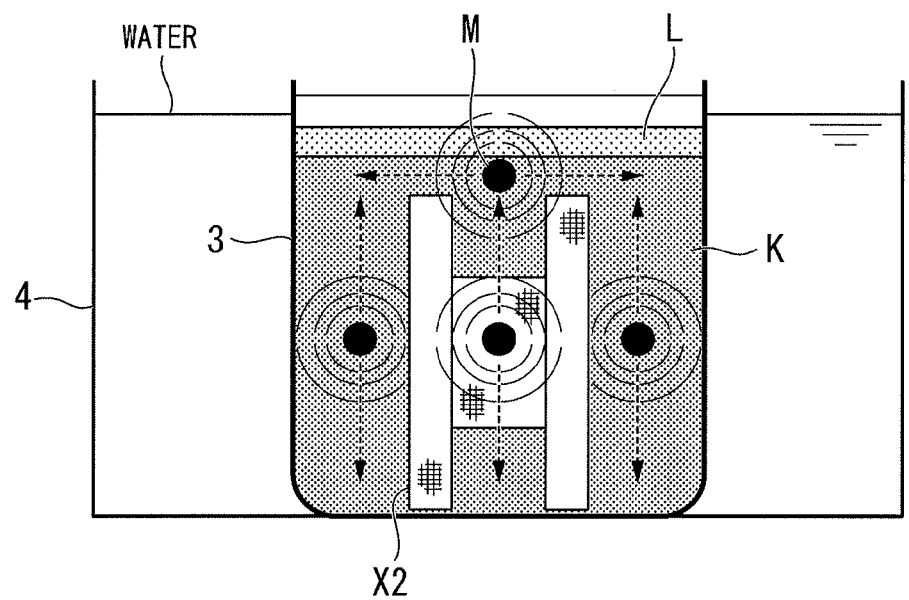
FIG. 2A is a front view of an impregnation container containing a molded fabric body, showing a powder material impregnation method according to an embodiment of the present invention.

Hereunder is a description of an embodiment of the present invention with reference to the drawings.

A method for producing a ceramic matrix composite (CMC) according to the present embodiment includes: a molded fabric body producing step; a C-CVD step; a CVI matrixing step; an SPI matrixing step; a PIP matrixing step; a machining step; and a surface coating step, as shown in FIG. 1.

The steps will be described below one by one. The SPI matrixing step includes a powder material impregnation method according to the present embodiment, which is the most characteristic producing step in the method for producing a ceramic matrix composite (fiber-reinforced composite material). Furthermore, the ceramic matrix composite produced in the present producing method is used as heat-resistant parts such as stator vanes and shrouds used for aircraft gas turbines (engines), and as CMC chambers, combustion gas pipes, valves, and so on that are used in rocket engines.

[Molded Fabric Body Producing Step]

In the molded fabric body producing step, fiber bundles each made of approximately hundreds of silicon carbide (SiC) fibers with a diameter of approximately 10 μm are woven lengthwise and crosswise to form a fabric fragment. Several fabric fragments are then combined to produce a molded fabric body X with a 3-dimensional shape (cubic shape). Note that the molded fabric body X may not be a combination of several fabric fragments but may be produced from a single fabric. For example, in the case of a molded fabric body X with an "H shape" in its front view and cross-sectional view as shown in FIG. 2A to FIG. 5C, two portions that face in parallel with each other are made of two fabric fragments with the same shape, and the two fabric fragments are couple to each other at their central portions with another fabric fragment.

[C-CVD Step]

The C-CVD step is a treatment step of coating carbon (C) on a surface of the molded fabric body X based on the CVD (Chemical Vapor Deposition) method. Namely, in the C-CVD step, the molded fabric body X is contained in a chamber 2. Then, a $CH_4$ gas (methane gas) is supplied into the chamber 2, and at the same time, the chamber 2 is heated, to thereby form an interface layer made of carbon (C) on the surface of each silicon carbide fiber in the molded fabric body X. With this C-CVD step, it is possible to weaken the adhesiveness of the matrix to the surface of the silicon carbide fiber. As a result, even if the matrix is cracked, it is possible to prevent the fabric from being cracked.

As a means of similarly weakening the adhesiveness of the matrix, not carbon (C) but a boron nitride (BN) may be coated on the surfaces of the silicon carbide fibers by the CVD method.

[CVI Matrixing Step]

The CVI matrixing step is a treatment step based on the CVI (Chemical Vapor Infiltration) method. In the CVI matrixing step, a molded fabric body X1 obtained through the C-CVD step is contained in the chamber 2. In addition, a $SiCl_3CH_3$ gas is supplied into the chamber 2, and the chamber 2 is heated, to thereby attach a silicon carbide (SiC) on the surfaces of the silicon carbide fibers in the molded fabric body X1. According to this CVI matrixing step, the silicon carbide (SiC) as a film form is impregnated into and attached to the spaces between the silicon carbide fibers that constitute the fiber bundles of the molded fabric body X, X1.

This CVI matrixing step is a chemical treatment in a vapor phase. Therefore, it is possible to impregnate and attach silicon carbide (SiC) into and to the spaces between the silicon carbide fibers that constitute the fiber bundles of the molded fabric body X, X1, namely, in and to the spaces smaller than those between the fiber bundles that constitute the molded fabric body X, X1.

[SPI Matrixing Step]

The SPI matrixing step is made of an SPI impregnation step as an initial step, and a reaction burning step as a subsequent step, as shown in FIG. 1.

A: SPI Impregnation Step

The SPI impregnation step corresponds to the powder material impregnation method in the present embodiment. It is a step of liquid-phase treating a molded fabric body X2 attached with the silicon carbide (SiC), which is obtained through the CVI matrixing step, to thereby impregnate the spaces of the fiber bundles in the molded fabric body X2 with the powder of carbon (C) and silicon (Si).

Figure 2B:
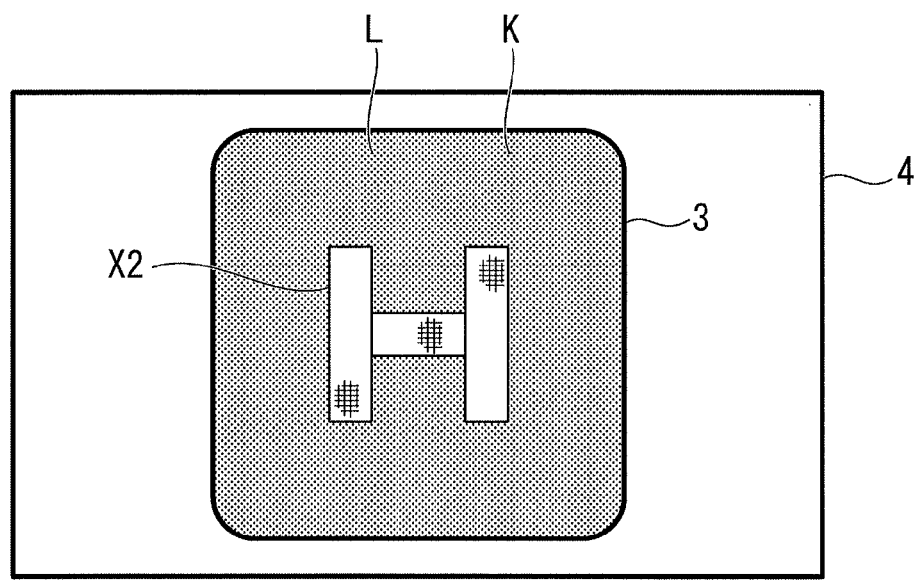
FIG. 2B is a top view of the impregnation container containing the molded fabric body, showing the powder material impregnation method according to the embodiment of the present invention.

In the SPI impregnation step, a mixed powder K in which a carbon (C) powder and a silicon (Si) powder are uniformly mixed is introduced, together with alcohol L (liquid dispersion medium) for a predetermined amount, into a box-shaped impregnation container 3 to prepare a slurry (first step). Then, as shown in FIG. 2A and FIG. 2B, the molded fabric body X2 (to which the silicon carbide (SiC) is attached) obtained in the CVI matrixing step is buried in the mixed powder K which is being immersed in the alcohol L. In this state, an ultrasonic vibrator M (vibrator) for vibrating the mixed powder K is inserted into the mixed powder K, and is then moved along a surface of the molded fabric body X2. Note that the impregnation container 3 is immersed in water that is contained in a water tank 4 as shown in the figures.

In the vibration method of Patent Document 1 described as a conventional technique, vibration is produced by use of an ultrasonic vibration exciter provided outside the container. On the other hand, in the vibration method for the mixed powder K in the SPI impregnation step, the ultrasonic vibrator M is inserted into the mixed powder K, and is also moved along the surface of the molded fabric body X2. Therefore, according to this vibration method, the vibration (ultrasonic waves) generated by the ultrasonic vibrator M effectively acts on the mixed powder K around the molded fabric body X2. As a result, the rate of impregnation of the mixed powder K into the spaces in the molded fabric body X2 significantly improves more than that of the conventional cases.

In FIG. 2A, only a single ultrasonic vibrator M is illustrated. However, a plurality of ultrasonic vibrators M may be provided in the mixed powder K, and each ultrasonic vibrator M may be moved along the surface of the molded fabric body X2. Furthermore, in addition to providing the ultrasonic vibrator M in the mixed powder K, ultrasonic vibrator(s) M may be provided also around the impregnation container 3 to vibrate the mixed powder K.

Furthermore, in FIG. 2A, the single ultrasonic vibrator M is moved along the surface of the molded fabric body X2. In this method, it takes time for the ultrasonic vibrator M to move over the whole surface of the molded fabric body X2. To efficiently move the ultrasonic vibrator M over the whole surface of the molded fabric body X2, a method as follows can be conceived. For example, a plurality of ultrasonic vibrators M are provided at predetermined intervals in a frame body the shape of which is analogous to and slightly larger than a horizontal cross-sectional shape of the molded fabric body X2 (an H shape in the illustration shown in FIG. 3B and so on). The frame body is moved in the vertical direction, to thereby move the ultrasonic vibrators M along the side surfaces of the molded fabric body X2.

Figure 3A:
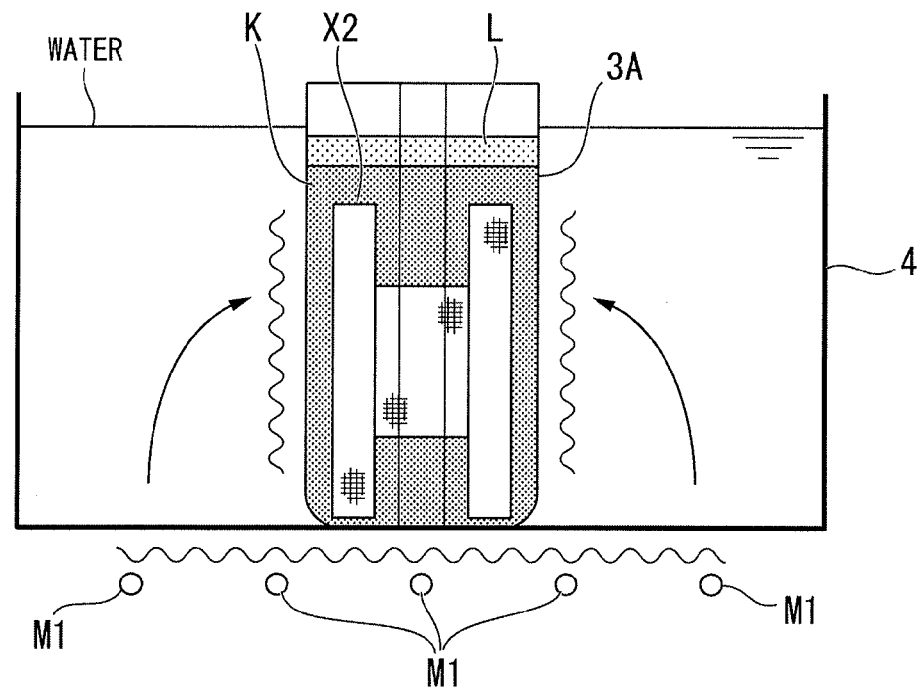
FIG. 3A is a front view of an impregnation container containing the molded fabric body, showing a powder material impregnation method according to an embodiment of the present invention.
Figure 3B:
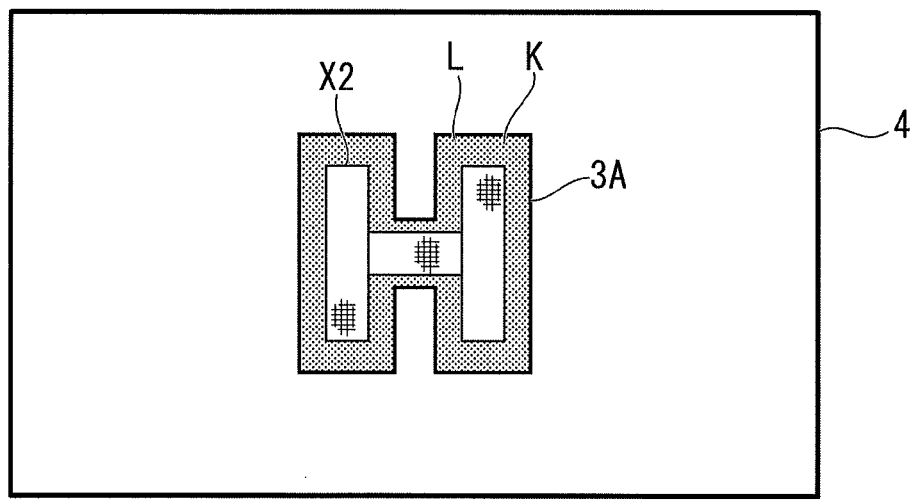
FIG. 3B is a top view of the impregnation container containing the molded fabric body, showing the powder material impregnation method according to the embodiment of the present invention.

Furthermore, as the vibration method for the mixed powder K, a method as shown in FIG. 3A and FIG. 3B can be conceived. FIG. 3A is a front view of an impregnation container containing a molded fabric body, and FIG. 3B is a top view of the impregnation container containing the molded fabric body. Namely, as shown in FIG. 3B, the aforementioned slurry and molded fabric body X2 are contained in an impregnation container 3A the shape of which is analogous to and slightly larger than a horizontal cross-sectional shape (H shape) of the molded fabric body X2, and the mixed powder K is vibrated by ultrasonic vibrators M1 provided underneath the impregnation container 3A.

According to this vibration method, it is possible to make the total amount of the mixed powder K smaller than that by the method shown in FIG. 2A and FIG. 2B. In addition, the impregnation container 3A is made smaller and lighter than the impregnation container 3 shown in FIG. 2A and FIG. 2B. Therefore, the mixed powder K is more likely to be vibrated than in the impregnation container 3 shown in FIG. 2A and FIG. 2B. Hence, even if the ultrasonic vibrators M are not directly put into the mixed powder K as by the method shown in FIG. 2A and FIG. 2B, it is possible to effectively vibrate the mixed powder K.

Figure 4:
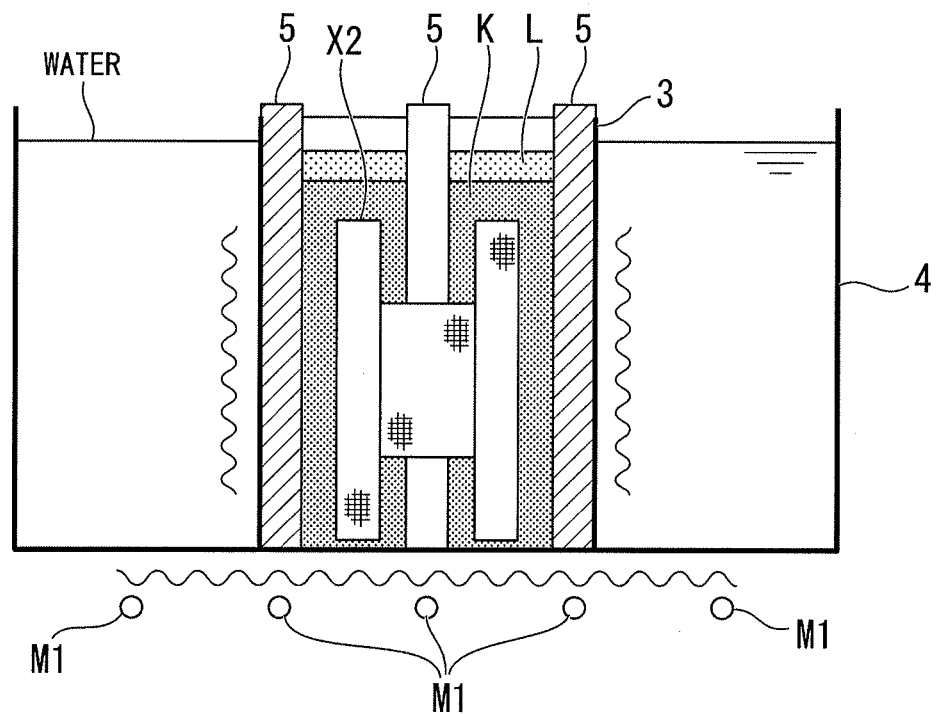
FIG. 4 is a front view of an impregnation container containing the molded fabric body, showing a powder material impregnation method according to an embodiment of the present invention.
Figure 5A:
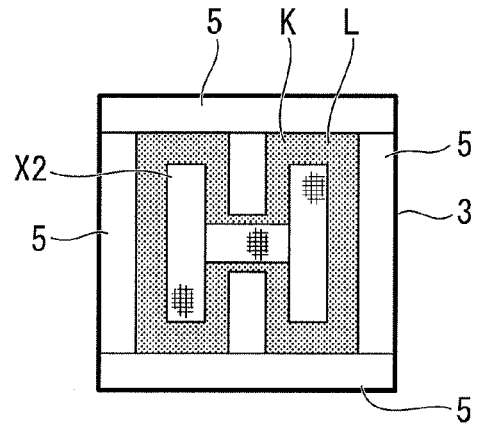
FIG. 5A is a top view of an impregnation container containing the molded fabric body, showing a powder material impregnation method according to an embodiment of the present invention.

Furthermore, as the vibration method for the mixed powder K, methods as shown in FIG. 4 and FIG. 5A to FIG. 5C can be conceived. Namely, as shown in FIG. 4 and FIG. 5A, vibration transmission members 5 for transmitting the vibration that is generated by the ultrasonic vibrators M1 provided beneath the impregnation container 3 may be arranged around the molded fabric body X2 in the impregnation container 3. As shown in FIG. 5A, the vibration transmission members 5 are a plate-like, solid metal material (for example, stainless steel or aluminum) that fill the sides of the molded fabric body X2 without a gap.

With the provision of these vibration transmission members 5, the vibration generated by the ultrasonic vibrators M1 provided beneath the impregnation container 3 is transmitted via the vibration transmission members 5 to the mixed powder K positioned at the side portions of the molded fabric body X2. Therefore, according to this vibration method, it is possible to uniformly vibrate the mixed powder K as a whole around the molded fabric body X2. As a result, it is possible to uniformly impregnate the entire region of the spaces inside the molded fabric body X2 with the mixed powder K.

Figure 5B:
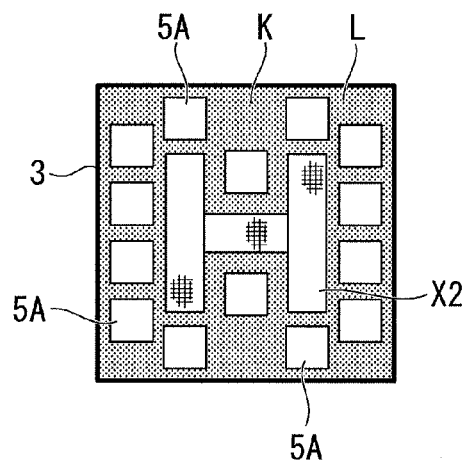
FIG. 5B is a top view of an impregnation container containing the molded fabric body, showing a powder material impregnation method according to an embodiment of the present invention.
Figure 5C:
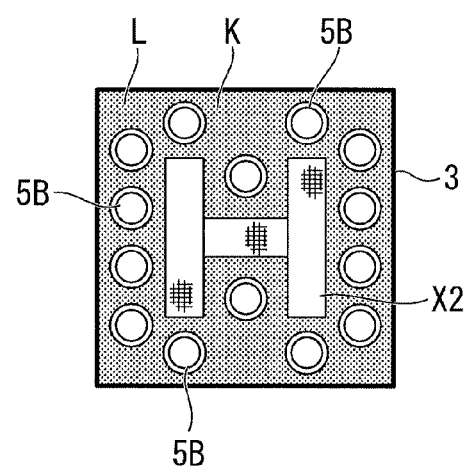
FIG. 5C is a top view of an impregnation container containing the molded fabric body, showing a powder material impregnation method according to an embodiment of the present invention.

Instead of the vibration transmission members 5 as shown in FIG. 4 and FIG. 5A, vibration transmission members 5A or vibration transmission members 5B as shown in FIG. 5B or FIG. 5C may be used. Namely, the vibration transmission members 5A shown in FIG. 5B are a square-rod-like, solid metal material, and are arranged around the molded fabric body X2 in a manner slightly spaced from each other.

On the other hand, the vibration transmission members 5B shown in FIG. 5C are round-rod-like, hollow metal pipes, and are arranged around the molded fabric body X2 in a manner slightly spaced from each other. According to this vibration method, both of the vibration transmission members 5A and the vibration transmission member 5B effectively transmit the vibration generated by the ultrasonic vibrators M1. Therefore, it is possible to uniformly impregnate the entire region of the spaces inside the molded fabric body X2 with the mixed powder K.

B: Reaction Burning Step

In the reaction burning step, a molded fabric body X3 obtained through the SPI matrixing step is dried, and is then contained in a burning furnace. Subsequently, the molded fabric body X3 is heated to, for example, a temperature (approximately 1420° C.) slightly above a melting point of silicon (Si) (1414° C.), to thereby cause the reaction of the carbon (C) and silicon (Si) attached to the spaces inside the molded fabric body X to occur to form a silicon carbide (SiC). According to this reaction burning step, it is possible to form a closely-packed silicon carbide (SiC) in the spaces inside the molded fabric body X because the carbon (C) and the silicon (Si) have been uniformly and closely dispersed in and attached to the spaces inside the molded fabric body X in the SPI matrixing step.

Furthermore, in the present embodiment, the silicon carbide (SiC) is attached to the spaces inside the molded fabric body X through the C-CVD step, the CVI matrixing step, and the SPI matrixing step. Therefore, it is possible to uniformly disperse and closely attach the silicon carbide (SiC) in and to the spaces inside the molded fabric body X.

[PIP Matrixing Step]

The PIP matrixing step is a closely-packing step based on the PIP (Polymer Impregnation and Pyrolysis) method. In the method, a treatment of immersing a burned body X4 obtained through the reaction burning step in a polycarbosilane solution and a heat treatment of the burned body X4 after the immersion are repeated one or more cycles, to thereby further closely impregnate/form a silicon carbide (material), which is identical to (the same in type as) the silicon carbide formed on the surface of the molded fabric body X in the reaction burning step, into/in the spaces inside the burned body X4.

[Machining Step]

The machining step is a step of subjecting a ceramic matrix composite X5 obtained through the PIP matrixing step to machining such as polishing. Through this machining step, an outer shape as a final part is completed.

[Surface Coating Step]

The surface coating step is a step of depositing a coating for enhancing the mechanical characteristics onto a ceramic matrix composite X6 obtained through the machining step. This surface coating step is performed when the mechanical characteristics of the ceramic matrix composite X6 fall short of the performance specifications of the final product.

The present invention is not limited to the above embodiment, and modifications as follows can be conceived.

(1) While production of a ceramic matrix composite has been described in the above embodiment, the present invention is not limited to this. Namely, the material of the fibers constituting the molded fabric body and the material of the powder that is impregnated into the spaces inside the molded fabric body are not limited to a silicon carbide (SiC).

Materials for fibers are grouped into non-oxide inorganic materials, oxide inorganic materials, and carbon (C). As non-oxide inorganic materials other than the aforementioned silicon carbide (SiC), a silicon nitride ($Si_3N_4$) and the like can be conceived. As oxide inorganic materials, alumina ($Al_2O_3$), mullite ($3Al_2O_3$-$2SiO_2$), zirconia ($ZrO_2$), silica ($SiO_2$), glass, and the like can be conceived. Furthermore, fibers made of a material in which these materials are mixed may be used.

On the other hand, materials of the powder are grouped into non-oxide inorganic materials, oxide inorganic materials, metal compounds, metals, and carbon (C). As non-oxide inorganic materials other than the aforementioned silicon carbide (SiC), a mixed powder of silicon (Si) and carbon; a silicon nitride ($Si_3N_4$); a zirconium carbide (ZrC); a zirconium nitride (ZrN); an aluminum nitride (AlN); a titanium carbide (TiC); a boron nitride (BN); a boron carbide ($B_4C$); or other various carbides and nitrides can be conceived.

As oxide inorganic materials, various ytterbium compounds ($Yb_2O_3$, $Yb_2SiO_5$, $Yb_2Si_2O_7$); a mixed powder of ytterbium oxide ($Yb_2O_3$) and silicon oxide ($SiO_2$); various yttrium compounds ($Y_2O_3$, $Y_2SiO_5$, $Y_2Si_2O_7$); a mixed powder of a yttrium oxide ($Y_2O_3$) and a silicon oxide ($SiO_2$); an aluminum oxide ($Al_2O_3$); mullite ($3Al_2O_3$-$2SiO_2$); a zirconium oxide ($ZrO_2$); a hafnium oxide ($HfO_2$); glass; or the like can be conceived.

As metal compounds, a molybdenum disilicide ($MoSi_2$); a mixed powder of molybdenum (Mo) and silicon (Si); a niobium silicide ($NbSi_2$); a mixed powder of niobium (Nb) and silicon (Si); or the like can be conceived. As metals, molybdenum (Mo), niobium (Nb), tungsten (W), or the like, which is known to have a high melting point, can be conceived. Note that a mixed powder of the non-oxide inorganic material, oxide inorganic material, metal compound, metal, and carbon (C) as illustrate above may be used as a material for the matrix.

(2) In the above embodiment, the alcohol L is used as a liquid dispersion medium for preparing the slurry of the mixed powder K. However, the present invention is not limited to this. So long as it is a liquid that effectively disperses the mixed powder K, a liquid other than the alcohol L may be used.

(3) In the above embodiment, the impregnation container 3, 3A is provided in the water tank 4, to thereby put the surrounding of the impregnation container 3, 3A in a water (liquid) atmosphere. However, the present invention is not limited to this. With the surrounding of the impregnation container 3, 3A being put in a liquid atmosphere, the vibration generated by the ultrasonic vibrators M1 is effectively transmitted and is then caused to act on the side surfaces of the impregnation container 3, 3A, to thereby make it possible to effectively vibrate the mixed powder K positioned at the sides of the molded fabric body X2. However, as required, the impregnation container 3, 3A may be put in a gas atmosphere such as in air. In this case, it is preferable that ultrasonic vibrators M1 be provided also at the sides of the impregnation container 3, 3A to thereby vibrate the mixed powder K positioned at the sides of the molded fabric body X2.

EXAMPLE

An example is shown below to describe an advantageous effect of the present invention.

Figure 6:
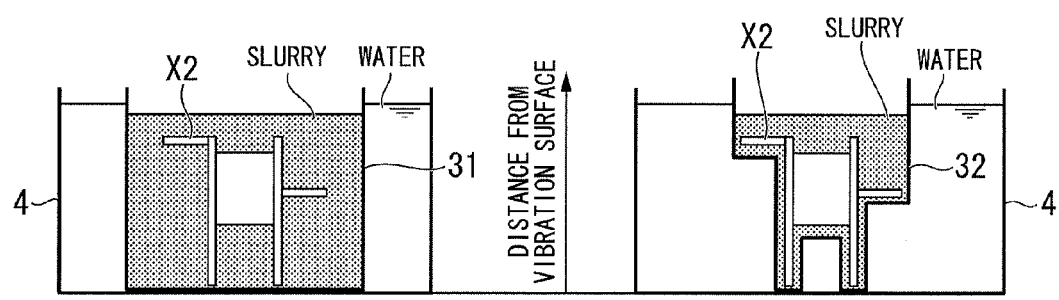
FIG. 6 is a diagram showing a difference in shape between the impregnation container according to an example of the present invention and a conventional impregnation container.

As shown in FIG. 6, two types of impregnation container, namely, impregnation containers 31, 32 are prepared. The aforementioned slurry made of the mixed powder and alcohol, and the aforementioned molded fabric body X2 are contained in each of the impregnation containers 31, 32. Then, each of the impregnation containers 31, 32 is immersed in water contained in the water tank 4. The mixed powder in each of the impregnation containers 31, 32 is vibrated by an ultrasonic vibrator provided beneath the water tank 4.

Here, the impregnation container 31 is a comparative example for describing the advantageous effect of the present invention, and is a cube shaped container which is capable of containing the molded fabric body X2. On the other hand, the impregnation container 32 is an example of the present invention, and has a shape analogous to and slightly larger than the outer shape of the molded fabric body X2.

Figure 7:
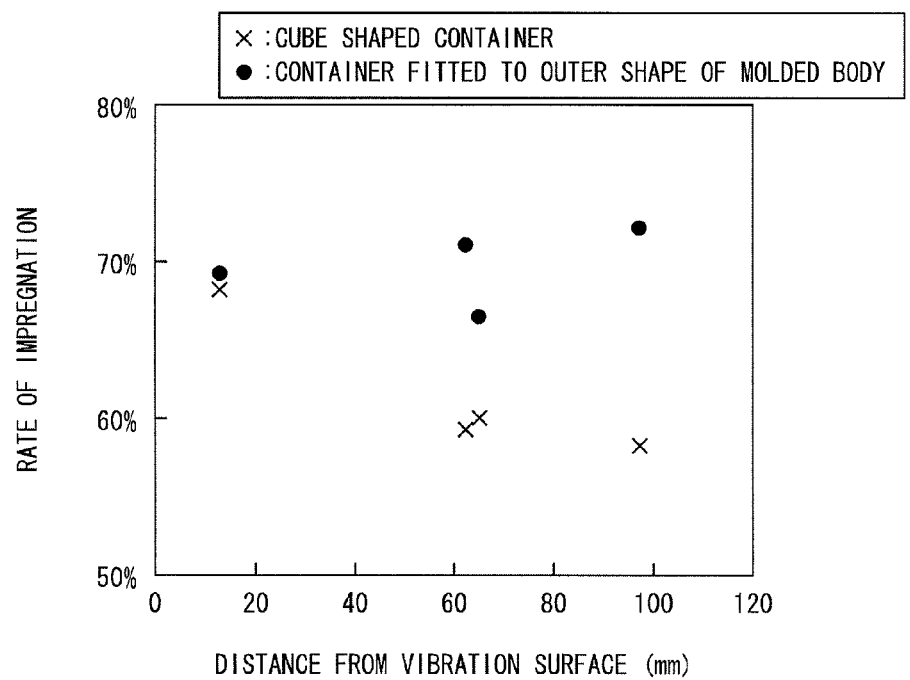
FIG. 7 is a graph showing an effect which the difference in shape of the impregnation container shown in FIG. 6 has on the rate of impregnation into a molded fabric body.

The relationship between the rate of impregnation of the mixed powder and the distance from the vibration surface has been researched in the molded fabric body X2 contained in each of the impregnation containers 31, 32, and the results as shown in FIG. 7 are obtained.

As is clear from FIG. 7, the rate of impregnation by use of the impregnation container 32 of the present invention is higher than that by use of the impregnation container 31 of the comparative example. In addition, in the case where the impregnation container 32 of the present invention is used, a high rate of impregnation is maintained even though the distance from the vibration surface is long. On the other hand, in the case where the impregnation container 31 of the comparative example is used, the rate of impregnation decreases as the distance from the vibration surface is longer.

Namely, it is found that, by use of the impregnation container 32 of the present invention, the mixed powder is effectively vibrated, to thereby obtain a high rate of impregnation.

INDUSTRIAL APPLICABILITY

According to the present invention, when the molded fabric body is impregnated with a powder of a predetermined material, it is possible to improve the rate of impregnation of the powder more than that in the conventional cases, irrespectively of the shape of the fabric.

REFERENCE SIGNS LIST

X, X1 to X3: molded fabric body
X4: burned body
X5, X6: ceramic matrix composite (fiber-reinforced composite material)
K: mixed powder
L: alcohol (liquid dispersion medium)
M, M1: ultrasonic vibrator (vibrator)
1, 2: chamber
3, 3A: impregnation container
4: water tank
5, 5A, 5B: vibration transmission member

The invention claimed is:

1. A powder material impregnation method comprising:
a first step of dispersing a powder of a predetermined material in a liquid to prepare a slurry; and
a second step of burying a molded fabric body made of fiber bundles in the slurry and vibrating the slurry by use of a predetermined vibrator,
wherein, in the second step, the vibrator is moved along a whole surface of the molded fabric body.

2. The powder material impregnation method according to claim 1, wherein:
the predetermined material comprises carbon (C) and silicon (Si); and
the fiber bundle is made of a silicon carbide (SiC).

3. A method for producing a fiber-reinforced composite material, comprising:
a molded body producing step of producing a predetermined-shaped molded fabric body from a fabric fragment that is woven from fiber bundles;
a first impregnation step of impregnating the molded fabric body with a predetermined material by subjecting the molded fabric body to a vapor phase treatment;
a second impregnation step of impregnating the molded fabric body with a predetermined material by the powder material impregnation method according to claim 1; and
a reaction burning step of subjecting the molded fabric body obtained through the second impregnation step to a reaction burning treatment.

4. The method for producing a fiber-reinforced composite material according to claim 3, further comprising:
a closely-packing step of impregnating the burned body with a material of a same type as the powder by a PIP (Polymer Impregnation and Pyrolysis) method, to thereby make the burned body more closely-packed.

5. A powder material impregnation method comprising:
a first step of dispersing a powder of a predetermined material in a liquid to prepare a slurry; and
a second step of burying a molded fabric body made of fiber bundles in the slurry and vibrating the slurry by use of a predetermined vibrator,
wherein, in the second step, the slurry and the molded fabric body are fitted into a container having an inner shape corresponding to an outer shape of the molded fabric body, and the vibrator is arranged on a surface of the container to vibrate the slurry.

6. The powder material impregnation method according to claim 5, wherein:
the predetermined material comprises carbon (C) and silicon (Si); and
the fiber bundle is made of a silicon carbide (SiC).

7. A method for producing a fiber-reinforced composite material, comprising:
a molded body producing step of producing a predetermined-shaped molded fabric body from a fabric fragment that is woven from fiber bundles;
a first impregnation step of impregnating the molded fabric body with a predetermined material by subjecting the molded fabric body to a vapor phase treatment;
a second impregnation step of impregnating the molded fabric body with a predetermined material by the powder material impregnation method according to claim 5; and
a reaction burning step of subjecting the molded fabric body obtained through the second impregnation step to a reaction burning treatment.

8. The method for producing a fiber-reinforced composite material according to claim 7, further comprising:
a closely-packing step of impregnating the burned body with a material of a same type as the powder by a PIP (Polymer Impregnation and Pyrolysis) method, to thereby make the burned body more closely-packed.

9. The powder material impregnation method according to claim 5, wherein the inner shape of the container corresponds to the entire outer shape of the molded fabric body to enclose the molded fabric body on all sides.

10. A powder material impregnation method comprising:
a first step of dispersing a powder of a predetermined material in a liquid to prepare a slurry; and
a second step of burying a molded fabric body made of fiber bundles in the slurry and vibrating the slurry by use of a predetermined vibrator,
wherein, in the second step, a vibration transmission member for transmitting a vibration generated by the vibrator is arranged to enclose all sides of the molded fabric body around the molded fabric body.

11. The powder material impregnation method according to claim 10,
wherein the vibration transmission member comprises a plurality of solid or hollow metal materials that stand around the molded fabric body.

12. The powder material impregnation method according to claim 10, wherein:
the predetermined material comprises carbon (C) and silicon (Si); and
the fiber bundle is made of a silicon carbide (SiC).

13. A method for producing a fiber-reinforced composite material, comprising:
a molded body producing step of producing a predetermined-shaped molded fabric body from a fabric fragment that is woven from fiber bundles;
a first impregnation step of impregnating the molded fabric body with a predetermined material by subjecting the molded fabric body to a vapor phase treatment;
a second impregnation step of impregnating the molded fabric body with a predetermined material by the powder material impregnation method according to claim 10; and
a reaction burning step of subjecting the molded fabric body obtained through the second impregnation step to a reaction burning treatment.

14. The method for producing a fiber-reinforced composite material according to claim 13, further comprising:
   a closely-packing step of impregnating the burned body with a material of a same type as the powder by a PIP (Polymer Impregnation and Pyrolysis) method, to thereby make the burned body more closely-packed.

* * * * *